United States Patent
Hosoe et al.

(10) Patent No.: US 8,497,037 B2
(45) Date of Patent: Jul. 30, 2013

(54) CURRENT COLLECTOR USING THREE-DIMENSIONAL NETWORK ALUMINUM POROUS BODY, ELECTRODE USING THE CURRENT COLLECTOR, AND NONAQUEOUS ELECTROLYTE BATTERY, CAPACITOR AND LITHIUM-ION CAPACITOR WITH NONAQUEOUS ELECTROLYTIC SOLUTION, EACH USING THE ELECTRODE, AND METHOD FOR PRODUCING THE ELECTRODE

(75) Inventors: Akihisa Hosoe, Osaka (JP); Kazuki Okuno, Osaka (JP); Hajime Ota, Osaka (JP); Koutarou Kimura, Osaka (JP); Kengo Goto, Osaka (JP); Hideaki Sakaida, Osaka (JP); Junichi Nishimura, Imizu (JP)

(73) Assignees: Sumitomo Electric Industries, Ltd., Osaka-shi, Osaka (JP); Sumitomo Electric Toyama Co., Ltd., Imizu-shi, Toyama (JP)

( * ) Notice: Subject to any disclaimer, the term of this patent is extended or adjusted under 35 U.S.C. 154(b) by 0 days.

(21) Appl. No.: 13/539,557

(22) Filed: Jul. 2, 2012

(65) Prior Publication Data
US 2012/0328941 A1    Dec. 27, 2012

(30) Foreign Application Priority Data
Feb. 18, 2011 (JP) ................................. 2011-032829
Dec. 21, 2011 (JP) ................................. 2011-279137

(51) Int. Cl.
*H01M 4/02* (2006.01)

(52) U.S. Cl.
USPC ........... 429/211; 429/121; 429/122; 429/208; 429/235

(58) Field of Classification Search
USPC .......................... 429/121, 122, 208, 235, 211
See application file for complete search history.

(56) References Cited

U.S. PATENT DOCUMENTS
6,187,473 B1    2/2001    Tamezane et al.

FOREIGN PATENT DOCUMENTS
| JP | 56-86459 | 7/1981 |
| JP | 4-19960 | 1/1992 |
| JP | 8-170126 | 7/1996 |
| JP | 11-149914 | 6/1999 |
| JP | 3202072 | 8/2001 |
| JP | 3413662 | 6/2003 |
| JP | 2005-285629 | 10/2005 |
| JP | 2008-181825 | 8/2008 |
| JP | 2009-163976 | 7/2009 |

OTHER PUBLICATIONS
U.S. Appl. No. 13/539,583, Hosoe et al.
U.S. Appl. No. 13/557,430, Hosoe et al.

(Continued)

*Primary Examiner* — Jane Rhee
(74) *Attorney, Agent, or Firm* — Drinker Biddle & Reath LLP

(57) ABSTRACT

It is an object of the present invention to provide an electrode using a current collector made of an aluminum porous body which is suitably used for an electrode for a nonaqueous electrolyte battery and an electrode for a capacitor, and a method for producing the electrode. In the current collector of the present invention, a strip-shaped compressed part compressed in a thickness direction is formed at one end part of a three-dimensional network aluminum porous body and a tab lead is bonded to the compressed part by welding. The width of the compressed part is 2 to 10 mm. Further, the electrode is formed by filling the current collector with an active material.

16 Claims, 14 Drawing Sheets

OTHER PUBLICATIONS

U.S. Appl. No. 13/539,573, Hosoe et al.
U.S. Appl. No. 13/483,505, Hosoe et al.
U.S. Appl. No. 13/569,288, Hosoe et al.
U.S. Appl. No. 13/483,609, Hosoe et al.
U.S. Appl. No. 13/483,626, Hosoe et al.
U.S. Appl. No. 13/569,300, Hosoe et al.
U.S. Appl. No. 13/494,353, Hosoe et al.
U.S. Appl. No. 13/569,319, Hosoe et al.
U.S. Appl. No. 13/569,322, Hosoe et al.
U.S. Appl. No. 13/569,325, Hosoe et al.
U.S. Appl. No. 13/539,587, Hosoe et al.
U.S. Appl. No. 13/557,442, Hosoe et al.
U.S. Appl. No. 13/470,817, Hosoe et al.

CURRENT COLLECTOR USING THREE-DIMENSIONAL NETWORK ALUMINUM POROUS BODY, ELECTRODE USING THE CURRENT COLLECTOR, AND NONAQUEOUS ELECTROLYTE BATTERY, CAPACITOR AND LITHIUM-ION CAPACITOR WITH NONAQUEOUS ELECTROLYTIC SOLUTION, EACH USING THE ELECTRODE, AND METHOD FOR PRODUCING THE ELECTRODE

TECHNICAL FIELD

The present invention relates to a current collector using a three-dimensional network aluminum porous body and an electrode using a three-dimensional network aluminum porous body, which are used for a nonaqueous electrolyte battery (lithium battery, etc.), and a capacitor (hereinafter, simply referred to as a "capacitor") and a lithium-ion capacitor (hereinafter, simply referred to as a "lithium-ion capacitor"), each using a nonaqueous electrolytic solution, and a method for producing the same.

BACKGROUND ART

Metal porous bodies having a three-dimensional network structure have been used in a wide range of applications, such as various filters, catalyst supports and battery electrodes. For example, Celmet (manufactured by Sumitomo Electric Industries, Ltd., registered trademark) composed of three-dimensional network nickel porous body (hereinafter, referred to as a "nickel porous body") has been used as an electrode material for batteries, such as nickel-metal hydride batteries and nickel-cadmium batteries. Celmet is a metal porous body having continuous pores and characteristically has a higher porosity (90% or more) than other porous bodies such as metallic nonwoven fabrics. Celmet can be obtained by forming a nickel layer on the surface of the skeleton of a porous resin molded body having continuous pores such as urethane foam, then decomposing the resin molded body by heat treatment, and reducing the nickel. The nickel layer is formed by performing a conductive treatment of applying a carbon powder or the like to the surface of the skeleton of the resin molded body and then depositing nickel by electroplating.

On the other hand, as with nickel, aluminum has excellent characteristics such as a conductive property, corrosion resistance and lightweight, and for applications in batteries, for example, an aluminum foil in which an active material, such as lithium cobalt oxide, is applied onto the surface thereof has been used as a positive electrode for a lithium battery. In order to increase the capacity of a positive electrode, it is considered that a three-dimensional network aluminum porous body (hereinafter, referred to as an "aluminum porous body") in which the surface area of aluminum is increased is used and the inside of the aluminum is filled with an active material. The reason for this is that this allows the active material to be utilized even in an electrode having a large thickness and improves the active material availability ratio per unit area.

As a method for producing an aluminum porous body, Patent Literature 1 describes a method of subjecting a three-dimensional network plastic substrate having an inner continuous space to an aluminum vapor deposition process by an arc ion plating method to form a metallic aluminum layer having a thickness of 2 to 20 μm.

It is said that in accordance with this method, an aluminum porous body having a thickness of 2 to 20 μm is obtained, but since this method is based on a vapor-phase process, it is difficult to produce a large-area porous body, and it is difficult to form a layer which is internally uniform depend on the thickness or porosity of the substrate. Further, this method has problems that a formation rate of the aluminum layer is low and production cost is high since equipment for production is expensive. Moreover, when a thick film is formed, there is a possibility that cracks may be produced in the film or aluminum may exfoliate.

Patent Literature 2 describes a method of obtaining an aluminum porous body, including forming a film made of a metal (such as copper) on the skeleton of a resin foam molded body having a three-dimensional network structure, the metal having an ability to form a eutectic alloy at a temperature equal or below the melting point of aluminum, then applying an aluminum paste to the film, and performing a heat treatment in a non-oxidizing atmosphere at a temperature of 550° C. or higher and 750° C. or lower to remove an organic constituent (resin foam) and sinter an aluminum powder.

However, in accordance with this method, a layer which forms a eutectic alloy of the above-mentioned metal and aluminum is produced and an aluminum layer of high purity cannot be formed.

As other methods, it is considered that a resin molded body having a three-dimensional network structure is subjected to aluminum plating. An electroplating process of aluminum itself is known, but since aluminum has high chemical affinity to oxygen and a lower electric potential than hydrogen, the electroplating in a plating bath containing an aqueous solution system is difficult. Thus, conventionally, aluminum electroplating has been studied in a plating bath containing a nonaqueous solution system. For example, as a technique for plating a metal surface with aluminum for the purpose of antioxidation of the metal surface, Patent Literature 3 discloses an aluminum electroplating method wherein a low melting composition, which is a blend melt of an onium halide and an aluminum halide, is used as a plating bath, and aluminum is deposited on a cathode while the water content of the plating bath is maintained at 2 mass % or less.

However, in the aluminum electroplating, plating of only a metal surface is possible, and there is no known method of electroplating on the surface of a resin molded body, in particular electroplating on the surface of a resin molded body having a three-dimensional network structure.

The present inventors have made earnest investigations concerning a method of electroplating the surface of a resin molded body made of polyurethane having a three-dimensional network structure with aluminum, and have found that it is possible to electroplate the surface of a resin molded body made of polyurethane by plating the resin molded body made of polyurethane, in which at least the surface is made electrically conductive, with aluminum in a molten salt bath. These findings have led to completion of a method for producing an aluminum porous body. In accordance with this production method, an aluminum structure having a resin molded body made of polyurethane as the core of its skeleton can be obtained. For some applications such as various filters and catalyst supports, the aluminum structure may be used as a resin-metal composite as it is, but when the aluminum structure is used as a metal structure without resin because of constraints resulting from the usage environment, an aluminum porous body needs to be formed by removing the resin.

Removal of the resin can be performed by any method, including decomposition (dissolution) with an organic solvent, a molten salt or supercritical water, decomposition by heating or the like.

Here, a method of decomposition by heating at high temperature or the like is convenient, but it involves oxidation of aluminum. Since aluminum is difficult to reduce after being oxidized once as distinct from nickel, if being used in, for example, an electrode material of a battery or the like, the electrode loses a conductive property due to oxidation, and therefore aluminum cannot be used as the electrode material. Thus, the present inventors have completed a method for producing an aluminum porous body, in which an aluminum structure obtained by forming an aluminum layer on the surface of a resin molded body is heated to a temperature equal to or below the melting point of aluminum in a state being dipped in a molten salt while applying a negative potential to the aluminum layer to remove the resin molded body through thermal decomposition to obtain an aluminum porous body, as a method of removing a resin without causing the oxidation of aluminum.

Incidentally, in order to use the aluminum porous body thus obtained as an electrode, it is necessary to attach a lead wire to the aluminum porous body to form a current collector, fill the aluminum porous body serving as the current collector with an active material, and subject the resulting aluminum porous body to treatments such as compressing and cutting by a process shown in FIG. 1, but a technology for practical use for industrially producing electrodes for nonaqueous electrolyte batteries, and capacitors and the like using a nonaqueous electrolytic solution from an aluminum porous body has not yet been known.

CITATION LIST

Patent Literatures

Patent Literature 1: Japanese Patent No. 3413662
Patent Literature 2: Japanese Unexamined Patent Publication No. 8-170126
Patent Literature 3: Japanese Patent No. 3202072
Patent Literature 4: Japanese Unexamined Patent Publication No. 56-86459

SUMMARY OF INVENTION

Technical Problem

It is an object of the present invention to provide a method for producing a current collector and an electrode by welding a lead to an aluminum porous body in a process of industrially producing a current collector and an electrode from an aluminum porous body, and a current collector and an electrode, which are respectively produced by the method.

Solution To Problem

The constitution of the present invention is as follows.

(1) A current collector obtained by forming a strip-shaped compressed part compressed in a thickness direction at one end part of a three-dimensional network aluminum porous body and bonding a tab lead to the compressed part by welding, wherein the compressed part has a width of 2 to 10 mm.

(2) The current collector according to (1), wherein a material of the above-mentioned tab lead contains aluminum.

(3) An electrode, comprising filling a porous portion of the current collector according to (1) or (2) with an active material.

(4) A method for producing the electrode according to (3), comprising steps of filling a three-dimensional network aluminum porous body with an active material; removing the active material in a portion within a 2 to 10 mm width from an end side at one end part of the three-dimensional network aluminum porous body filled with the active material; compressing the portion, from which the active material is removed, to form a strip-shaped compressed part; and welding a tab lead to the compressed part.

(5) A method for producing the electrode according to (3), comprising steps of compressing a portion within a 2 to 10 mm width from an end side at one end part of a three-dimensional network aluminum porous body to form a strip-shaped compressed part; masking the compressed part; filling the three-dimensional network aluminum porous body subjected to the masking with an active material; removing the masking from the three-dimensional network aluminum porous body filled with the active material; and welding a tab lead to the compressed part from which the masking is removed.

(6) A method for producing the electrode according to (3), comprising steps of compressing a portion within a 2 to 10 mm width from an end side at one end part of a three-dimensional network aluminum porous body to form a strip-shaped compressed part; welding a tab lead to the compressed part; and filling the three-dimensional network aluminum porous body having the tab lead welded to the compressed part with an active material.

(7) A nonaqueous electrolyte battery, comprising using the electrode according to (3).

(8) A capacitor using a nonaqueous electrolytic solution, comprising using the electrode according to (3).

(9) A lithium-ion capacitor using a nonaqueous electrolytic solution, comprising using the electrode according to (3).

Advantageous Effects of Invention

The electrode produced by using the aluminum porous body for a current collector of the present invention increases the availability ratio of an active material per a unit volume and can realize a higher capacity, and can decrease the number of layers of a laminate to reduce processing cost in processing the aluminum porous body into an electrode.

DESCRIPTION OF EMBODIMENTS

First, a method for producing the aluminum porous body of the present invention will be described. Hereinafter, the production method will be described with reference to the drawings if necessary, taking an example in which an aluminum plating method is applied as a method of forming an aluminum film on the surface of a resin molded body made of polyurethane for a representative example. Throughout the reference figures hereinafter, the parts assigned the same number are the same parts or the corresponding parts. The present invention is not limited thereto but is defined by the claims, and all modifications which fall within the scope of the claims and the equivalents thereof are intended to be embraced by the claims.

(Step of Producing Aluminum Structure)

Figure 6:
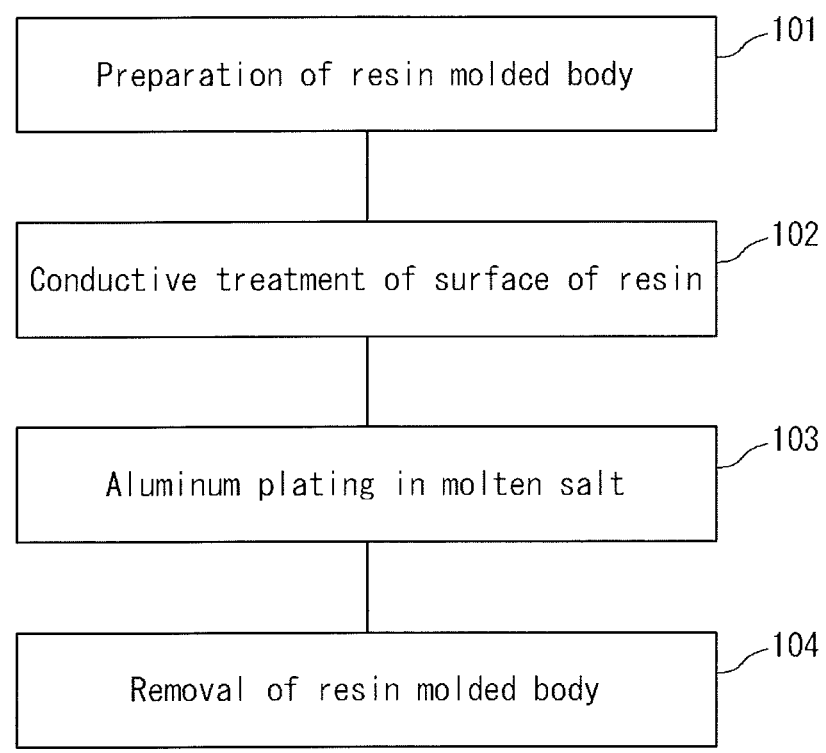
FIG. 6 is a flow chart showing a step of producing an aluminum porous body.
Figure 7A:
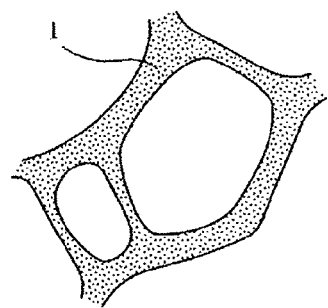
FIGS. 7A, 7B, 7C and 7D are schematic sectional views illustrating a step of producing an aluminum porous body.
Figure 7B:
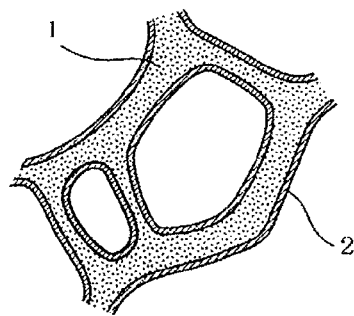

FIG. 6 is a flow chart showing a step of producing an aluminum structure. FIGS. 7A, 7B, 7C and 7D show schematic views of the formation of an aluminum plating film using a resin molded body as a core material in accordance with the flow chart. The overall flow of the production step will be described with reference to both figures. First, preparation 101 of a resin molded body serving as a base material is performed. FIG. 7A is an enlarged schematic view of the surface of a resin molded body having continuous pores as an example of a resin molded body serving as a base material. Pores are formed in the skeleton of a resin molded body 1. Next, a conductive treatment 102 of the surface of the resin molded body is performed. As illustrated in FIG. 7B, through this step, a thin conductive layer 2 made of an electric conductor is formed on the surface of the resin molded body 1.

Figure 7C:
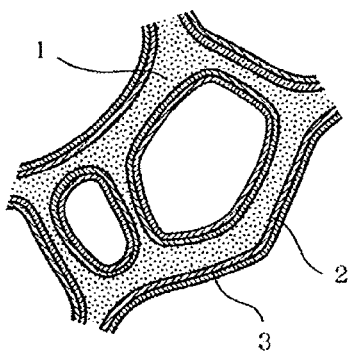

Subsequently, aluminum plating 103 in a molten salt is performed to form an aluminum plated layer 3 on the surface of the conductive layer of the resin molded body (FIG. 7C). Thereby, an aluminum structure is obtained in which the aluminum plated layer 3 is formed on the surface of the resin molded body serving as a base material. Removal 104 of the resin molded body serving as the base material is performed.

Figure 7D:
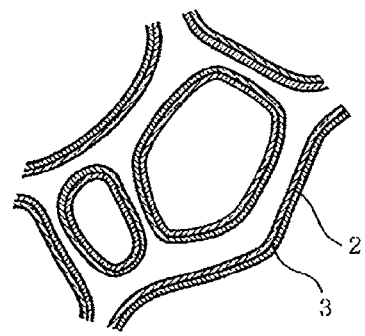

The resin molded body 1 can be removed by decomposition or the like to obtain an aluminum structure (porous body) containing only a remaining metal layer (FIG. 7D). Hereinafter, each of these steps will be described in turn.

(Preparation of Resin Molded Body)

A resin molded body having a three-dimensional network structure and continuous pores is prepared. A material of the resin molded body may be any resin. As the material, a resin foam molded body made of polyurethane, melamine resin, polypropylene or polyethylene can be exemplified. Though the resin foam molded body has been exemplified, a resin molded body having any shape may be selected as long as the resin molded body has continuously-formed pores (continuous pores). For example, a resin molded body having a shape like a nonwoven fabric formed by tangling fibrous resin can be used in place of the resin foam molded body. The resin foam molded body preferably has a porosity of 80% to 98% and a pore diameter of 50 μm to 500 μm. Urethane foams and melamine resin foams have a high porosity, continuity of pores, and excellent thermal decomposition properties and therefore they can be preferably used as the resin foam molded body. Urethane foams are preferred in points of uniformity of pores, easiness of availability and the like, and preferred in that urethane foams with a small pore diameter can be available.

Figure 8:
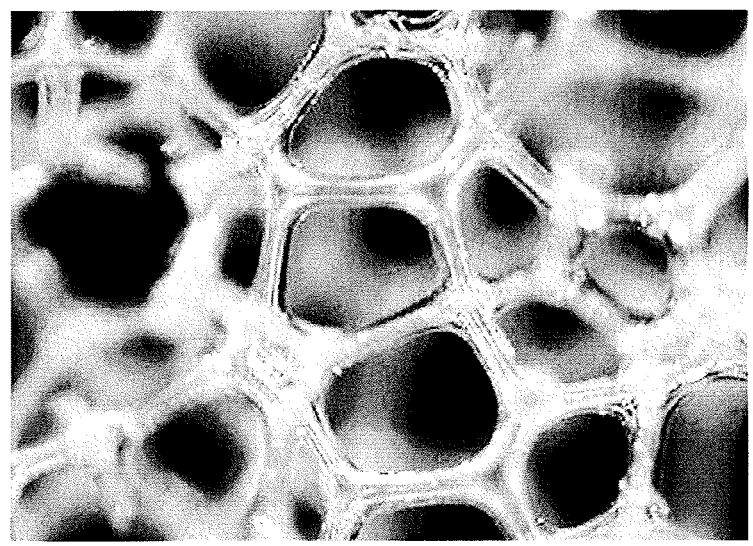
FIG. 8 is an enlarged photograph of the surface of the structure of a resin molded body made of polyurethane.

Resin molded bodies often contain residue materials such as a foaming agent and an unreacted monomer in the production of the foam, and are therefore preferably subjected to a washing treatment for the sake of the subsequent steps. As an example of the resin molded body, a urethane foam subjected to a washing treatment as a preliminary treatment is shown in FIG. 8. In the resin molded body, a three-dimensional network is configured as a skeleton, and therefore continuous pores are configured as a whole. The skeleton of the urethane foam has an almost triangular shape in a cross-section perpendicular to its extending direction. Herein, the porosity is defined by the following equation:

$$\text{Porosity} = (1-(\text{weight mass of porous material}[g]/(\text{volume of porous material}[cm^3] \times \text{material density}))) \times 100 [\%]$$

Further, the pore diameter is determined by magnifying the surface of the resin molded body in a photomicrograph or the like, counting the number of pores per inch (25.4 mm) as the number of cells, and calculating an average pore diameter by the following equation: average pore diameter=25.4 mm/the number of cells.

(Conductive Treatment of Surface of Resin Molded Body)

In order to perform electroplating, the surface of the resin foam is previously subjected to a conductive treatment. A method of the conductive treatment is not particularly limited as long as it is a treatment by which a layer having a conductive property can be disposed on the surface of the resin molded body, and any method, including electroless plating of a conductive metal such as nickel, vapor deposition and sputtering of aluminum or the like, and application of a conductive coating material containing conductive particles such as carbon or an aluminum powder, may be selected.

As an example of the conductive treatment, a method of making the surface of the resin foam electrically conductive by sputtering of aluminum, and a method of making the surface of the resin foam electrically conductive by using carbon as conductive particles will be described below.

Sputtering of Aluminum

A sputtering treatment using aluminum is not limited as long as aluminum is used as a target, and it may be performed according to an ordinary method. A sputtering film of aluminum is formed by, for example, holding a resin molded body with a substrate holder, and then applying a direct voltage between the holder and a target (aluminum) while introducing an inert gas into the sputtering apparatus to make an ionized inert-gas impinge onto the aluminum target and deposit the sputtered aluminum particles on the surface of the resin molded body. The sputtering treatment is preferably performed below a temperature at which the resin molded body is not melted, and specifically, the sputtering treatment may be performed at a temperature of about 100 to 200° C., and preferably at a temperature of about 120 to 180° C.

Carbon Application

A carbon coating material is prepared as a conductive coating material. A suspension liquid serving as the conductive coating material preferably contains carbon particles, a binder, a dispersing agent, and a dispersion medium. Uniform application of conductive particles requires maintenance of uniform suspension of the suspension liquid. Thus, the suspension liquid is preferably maintained at a temperature of 20 to 40° C. The reason for this is that a temperature of the suspension liquid below 20° C. results in a failure in uniform suspension, and only the binder is concentrated to form a layer on the surface of the skeleton constituting the network structure of the resin molded body. In this case, a layer of applied carbon particles tends to peel off, and metal plating firmly adhering to the substrate is hardly formed. On the other hand, when a temperature of the suspension liquid is higher than 40° C., since the amount of the dispersing agent to evaporate is large, with the passage of time of application treatment, the suspension liquid is concentrated and the amount of carbon to be applied tends to vary. The carbon particle has a particle diameter of 0.01 to 5 μm, and preferably 0.01 to 0.5 μm. A large particle diameter may result in the clogging of holes of the resin molded body or interfere with smooth plating, and too small particle diameter makes it difficult to ensure a sufficient conductive property.

Figure 9:
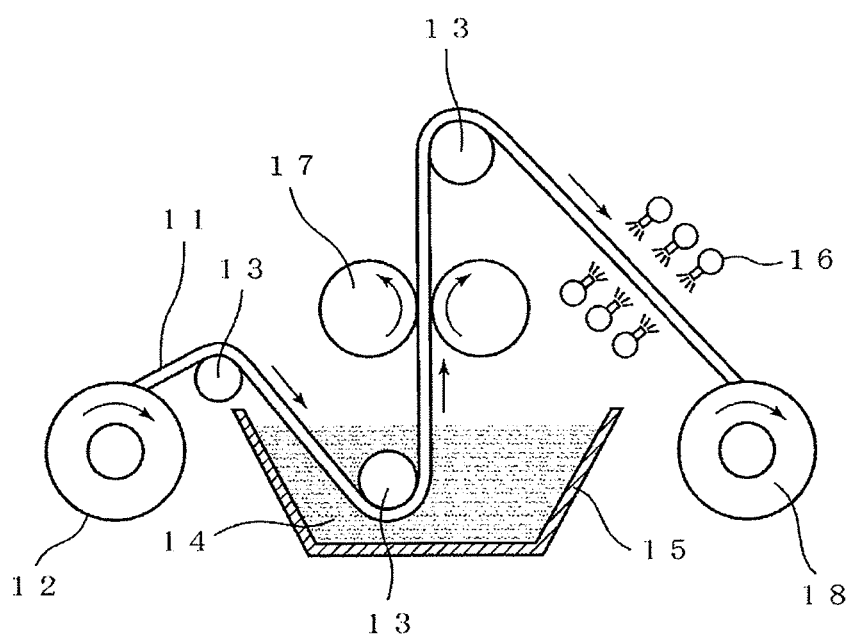
FIG. 9 is a view illustrating an example of a step of a continuous conductive treatment of the surface of a resin molded body with a conductive coating material.

The application of the carbon particles to the resin molded body can be performed by dipping the resin molded body to be a subject in the suspension liquid and squeezing and drying the resin molded body. FIG. 9 is a schematic view showing the configuration of a treatment apparatus for conductive treatment of a strip-shaped resin molded body (a strip-shaped resin), which is to serve as a skeleton, as an example of a practical production step. As shown in the figure, this apparatus includes a supply bobbin 12 for feeding a strip-shaped resin 11, a bath 15 containing a suspension liquid 14 of a conductive coating material, a pair of squeezing rolls 17 disposed above the bath 15, a plurality of hot air nozzles 16 disposed on opposite sides of the running strip-shaped resin 11, and a take-up bobbin 18 for taking up the treated strip-shaped resin 11. Further, a deflector roll 13 for guiding the strip-shaped resin 11 is appropriately disposed. In the apparatus thus configured, the strip-shaped resin 11 having a three-dimensional network structure is unwound from the supply bobbin 12, is guided by the deflector roll 13, and is dipped in the suspension liquid in the bath 15. The strip-shaped resin 11 dipped in the suspension liquid 14 in the bath 15 changes its direction upward and runs through between the squeezing rolls 17 disposed above the liquid surface of the suspension liquid 14. In this case, the distance between the squeezing rolls 17 is smaller than the thickness of the strip-shaped resin 11, and therefore the strip-shaped resin 11 is compressed. Thus, an excessive suspension liquid with which the strip-shaped resin 11 is impregnated is squeezed out into the bath 15.

Subsequently, the strip-shaped resin 11 changes its running direction again. The dispersion medium or the like of the suspension liquid is removed by hot air ejected from the hot air nozzles 16 configured by a plurality of nozzles, and the strip-shaped resin 11 fully dried is wound around the take-up bobbin 18. The temperature of the hot air ejected from the hot air nozzles 16 preferably ranges from 40° C. to 80° C. When such an apparatus is used, the conductive treatment can be automatically and continuously performed and a skeleton having a network structure without clogging and having a uniform conductive layer is formed, and therefore, the subsequent metal plating step can be smoothly performed.

(Formation of Aluminum Layer: Molten Salt Plating)

Next, an aluminum-plated layer is formed on the surface of the resin molded body by electroplating in a molten salt. By plating aluminum in the molten salt bath, a thick aluminum layer can be uniformly formed particularly on the surface of a complicated skeleton structure like the resin molded body having a three-dimensional network structure. A direct current is applied between a cathode of the resin molded body having a surface subjected to the conductive treatment and an anode of an aluminum plate with a purity of 99.0% in the molten salt. As the molten salt, an organic molten salt which is a eutectic salt of an organic halide and an aluminum halide or an inorganic molten salt which is a eutectic salt of an alkaline metal halide and an aluminum halide may be used. Use of an organic molten salt bath which melts at a relatively low temperature is preferred because it allows plating without the decomposition of the resin molded body, a base material. As the organic halide, an imidazolium salt, a pyridinium salt or the like may be used, and specifically, 1-ethyl-3-methylimidazolium chloride (EMIC) and butylpyridinium chloride (BPC) are preferred. Since the contamination of the molten salt with water or oxygen causes degradation of the molten salt, plating is preferably performed in an atmosphere of an inert gas, such as nitrogen or argon, and in a sealed environment.

The molten salt bath is preferably a molten salt bath containing nitrogen, and particularly an imidazolium salt bath is preferably used. In the case where a salt which melts at a high temperature is used as the molten salt, the dissolution or decomposition of the resin in the molten salt is faster than the growth of a plated layer, and therefore, a plated layer cannot be formed on the surface of the resin molded body. The imidazolium salt bath can be used without having any affect on the resin even at relatively low temperatures. As the imidazolium salt, a salt which contains an imidazolium cation having alkyl groups at 1,3-position is preferably used, and particularly, aluminum chloride+1-ethyl-3-methylimidazolium chloride ($AlCl_3$+EMIC)-based molten salts are most preferably used because of their high stability and resistance to decomposition. The imidazolium salt bath allows plating of urethane foam resins and melamine resin foams, and the temperature of the molten salt bath ranges from 10° C. to 65° C., and preferably 25° C. to 60° C. With a decrease in temperature, the current density range where plating is possible is narrowed, and plating of the entire surface of a resin molded body becomes difficult. The failure that a shape of a resin molded body is impaired tends to occur at a high temperature higher than 65° C.

With respect to molten salt aluminum plating on a metal surface, it is reported that an additive, such as xylene, benzene, toluene or 1,10-phenanthroline, is added to $AlCl_3$-EMIC for the purpose of improving the smoothness of the plated surface. The present inventors have found that particularly in aluminum plating of a resin molded body having a three-dimensional network structure, the addition of 1,10-phenanthroline has characteristic effects on the formation of an aluminum porous body. That is, it provides a first characteristic that the smoothness of a plating film is improved and the aluminum skeleton forming the porous body is hardly broken, and a second characteristic that uniform plating can be achieved with a small difference in plating thickness between the surface and the interior of the porous body.

In the case of pressing the completed aluminum porous body or the like, the above-mentioned two characteristics of the hard-to-break skeleton and the uniform plating thickness in the interior and exterior can provide a porous body which has a hard-to-break skeleton as a whole and is uniformly pressed. When the aluminum porous body is used as an electrode material for batteries or the like, it is performed that an electrode is filled with an electrode active material and is pressed to increase its density. However, since the skeleton is often broken in the step of filling the active material or pressing, the two characteristics are extremely effective in such an application.

According to the above description, the addition of an organic solvent to the molten salt bath is preferred, and particularly 1,10-phenanthroline is preferably used. The amount of the organic solvent added to the plating bath preferably ranges from 0.2 to 7 g/L. When the amount is 0.2 g/L or less, the resulting plating is poor in smoothness and brittle, and it is difficult to achieve an effect of decreasing a difference in thickness between the surface layer and the interior. When the amount is 7 g/L or more, plating efficiency is decreased and it is difficult to achieve a predetermined plating thickness.

Figure 10:
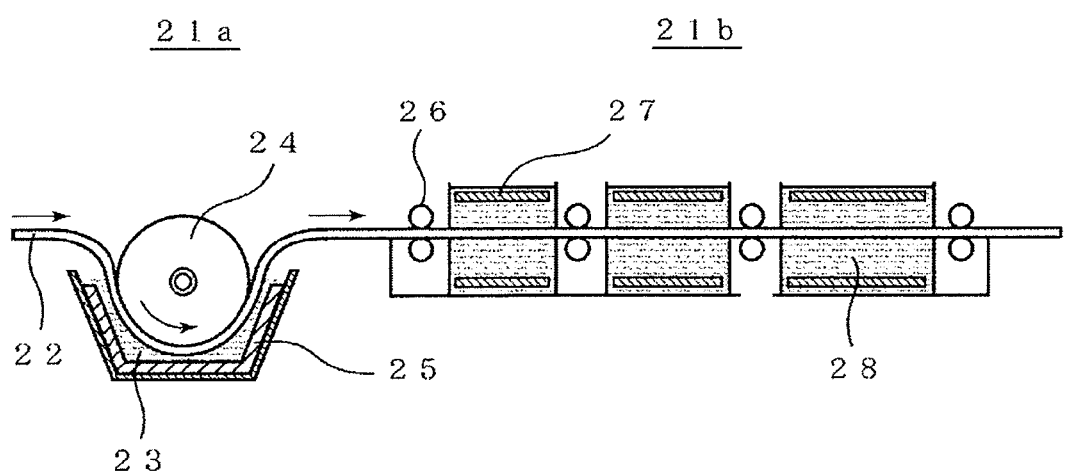
FIG. 10 is a view illustrating an example of a step of continuous aluminum plating utilizing molten salt plating.

FIG. 10 is a view schematically showing the configuration of an apparatus for continuously plating the above-mentioned strip-shaped resin with aluminum. This view shows a configuration in which a strip-shaped resin 22 having a surface subjected to a conductive treatment is transferred from the left to the right in the figure. A first plating bath 21a is configured by a cylindrical electrode 24, an aluminum anode 25 disposed on the inner wall of a container, and a plating bath 23. The strip-shaped resin 22 passes through the plating bath 23 along the cylindrical electrode 24, and thereby a uniform electric current can easily flow through the entire resin molded body, and uniform plating can be achieved. A plating bath 21b is a bath for further performing thick uniform plating and is configured by a plurality of baths so that plating can be performed multiple times. The strip-shaped resin 22 having a surface subjected to a conductive treatment passes through a plating bath 28 while being transferred by electrode rollers 26, which function as feed rollers and power feeding cathodes on the outside of the bath, to thereby perform plating. The plurality of baths include anodes 27 made of aluminum facing both faces of the resin molded body via the plating bath 28, which allow more uniform plating on both faces of the resin molded body. A plating liquid is adequately removed from the plated aluminum porous body by nitrogen gas blowing and then the plated aluminum porous body is washed with water to obtain an aluminum porous body.

On the other hand, an inorganic salt bath can also be used as a molten salt to an extent to which a resin is not melted or the like. The inorganic salt bath is a salt of a two-component system, typically $AlCl_3$—XCl (X: alkali metal), or a multi-component system. Such an inorganic salt bath usually has a higher molten temperature than that in an organic salt bath like an imidazolium salt bath, but it has less environmental constraints such as water content or oxygen and can be put to practical use at low cost as a whole. When the resin is a melamine foam resin, an inorganic salt bath at 60° C. to 150° C. is employed because the resin can be used at a higher temperature than a urethane foam resin.

An aluminum structure having a resin molded body as the core of its skeleton is obtained through the above-mentioned steps. For some applications such as various filters and a catalyst support, the aluminum structure may be used as a resin-metal composite as it is, but when the aluminum structure is used as a metal porous body without a resin because of constraints resulting from the usage environment, the resin is removed. In the present invention, in order to avoid causing the oxidation of aluminum, the resin is removed through decomposition in a molten salt described below.

(Removal of Resin: Treatment by Molten Salt)

The decomposition in a molten salt is performed in the following manner. A resin molded body having an aluminum plated layer formed on the surface thereof is dipped in a molten salt, and is heated while applying a negative potential (potential lower than a standard electrode potential of aluminum) to the aluminum layer to remove the resin molded body. When the negative potential is applied to the aluminum layer with the resin molded body dipped in the molten salt, the resin molded body can be decomposed without oxidizing aluminum. A heating temperature can be appropriately selected in accordance with the type of the resin molded body. When the resin molded body is urethane, a temperature of the molten salt bath needs to be 380° C. or higher since decomposition of urethane occurs at about 380° C., but the treatment needs to be performed at a temperature equal to or lower than the melting point (660° C.) of aluminum in order to avoid melting aluminum. A preferred temperature range is 500° C. or higher and 600° C. or lower. A negative potential to be applied is on the minus side of the reduction potential of aluminum and on the plus side of the reduction potential of the cation in the molten salt. In this manner, an aluminum porous body which has continuous pores, and has a thin oxide layer on the surface and a low oxygen content can be obtained.

The molten salt used in the decomposition of the resin may be a halide salt of an alkali metal or alkaline earth metal such that the aluminum electrode potential is lower. More specifically, the molten salt preferably contains one or more salts selected from the group consisting of lithium chloride (LiCl), potassium chloride (KCl), and sodium chloride (NaCl). In this manner, an aluminum porous body which has continuous pores, and has a thin oxide layer on the surface and a low oxygen content can be obtained.

Next, a process for producing an electrode from the aluminum porous body thus obtained will be described.

Figure 1:
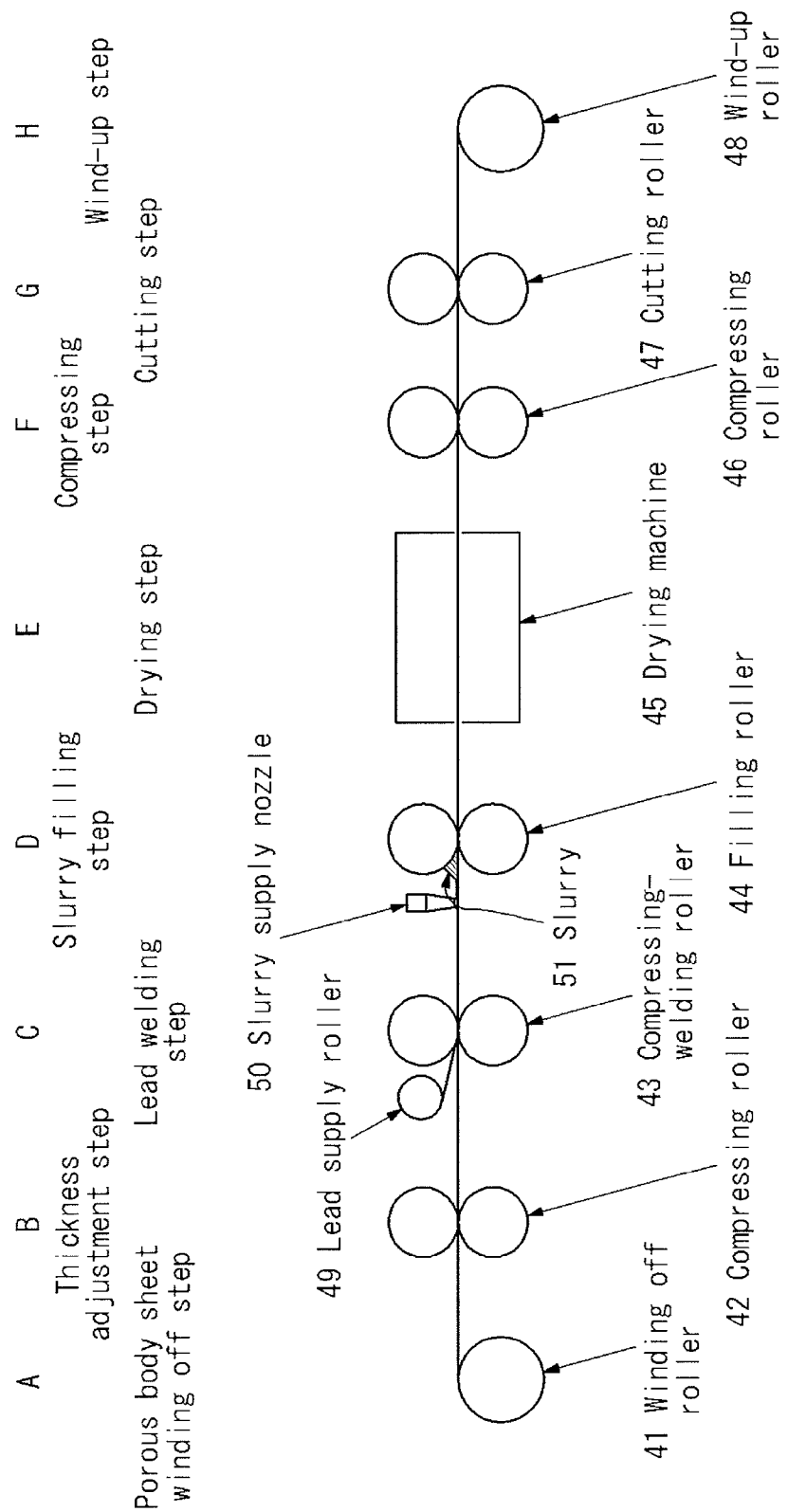
FIG. 1 is a view showing a process for producing an electrode material from an aluminum porous body.

FIG. 1 is a view illustrating an example of a process for continuously producing an electrode from an aluminum porous body. The process includes a porous body sheet winding off step A of winding off a porous body sheet from a winding off roller 41, a thickness adjustment step B using a compressing roller 42, a lead welding step C using a compressing/welding roller 43 and a lead welding roller 49, a slurry filling step D using a filling roller 44, a slurry supply nozzle 50 and a slurry 51, a drying step E using a drying machine 45, a compressing step F using a compressing roller 46, a cutting step G using a cutting roller 47, and a wind-up step H using a wind-up roller 48. Hereinafter, these steps will be described specifically.

(Thickness Adjustment Step)

An aluminum porous body sheet is wound off from a raw sheet roll around which the sheet of an aluminum porous body has been wound and is adjusted so as to have an optimum thickness and a flat surface by roller pressing in the thickness adjustment step. The final thickness of the aluminum porous body is appropriately determined in accordance with an application of an electrode, and this thickness adjustment step is a precompressing step of a compressing step for achieving the final thickness and compresses the aluminum porous body to a level of thickness at which a treatment in the following step is easily performed. A flat-plate press or a roller press is used as a pressing machine. The flat-plate press is preferable for suppressing the elongation of a current collector, but is not suitable for mass production, and therefore roller press capable of continuous treatment is preferably used.

(Lead Welding Step)

The characteristics of the present invention lies in this lead welding step.

The lead welding step includes steps of compressing an end part of the aluminum porous body, and bonding a tab lead to the compressed end part by welding.

Hereinafter, the above-mentioned steps will be described.

Compression of End Part of Aluminum Porous Body

When the aluminum porous body is used as an electrode current collector of a secondary battery or the like, a tab lead for external extraction needs to be welded to the aluminum porous body. In the case of an electrode using the aluminum porous body, since a robust metal part is not present in the aluminum porous body, it is impossible to weld a lead piece directly to the aluminum porous body. Therefore, an end part of the aluminum porous body is processed into the form of foil by compressing to impart mechanical strength thereto, and a tab lead is welded to the part.

An example of a method of processing the end part of the aluminum porous body will be described.

Figure 2:
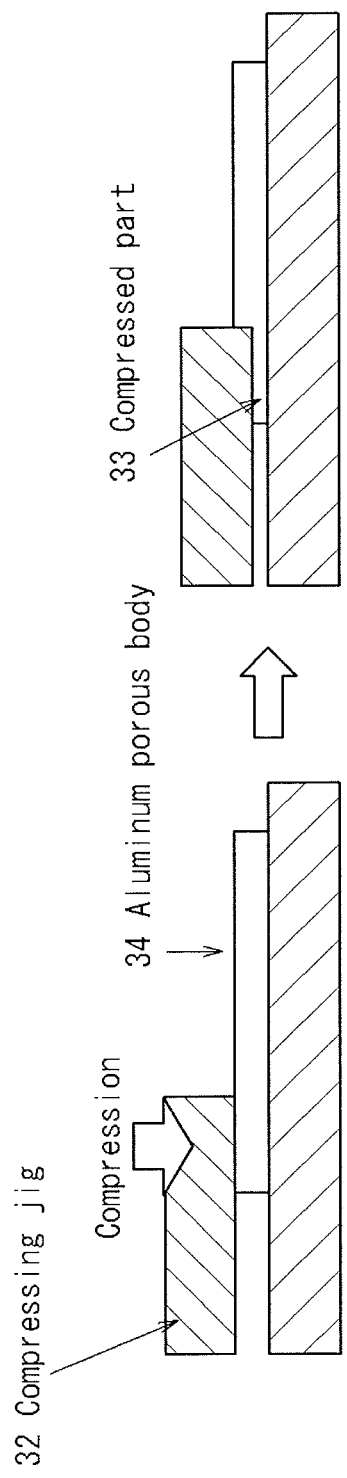
FIG. 2 is a view showing a step of compressing an end part of an aluminum porous body to form a compressed part.

FIG. 2 is a view schematically showing the compressing step.

A rotating roller can be used as a compressing jig.

When the compressed part has a thickness of about 0.05 mm or more and about 0.2 mm or less (for example, about 0.1 mm), predetermined mechanical strength can be achieved.

Figure 3:
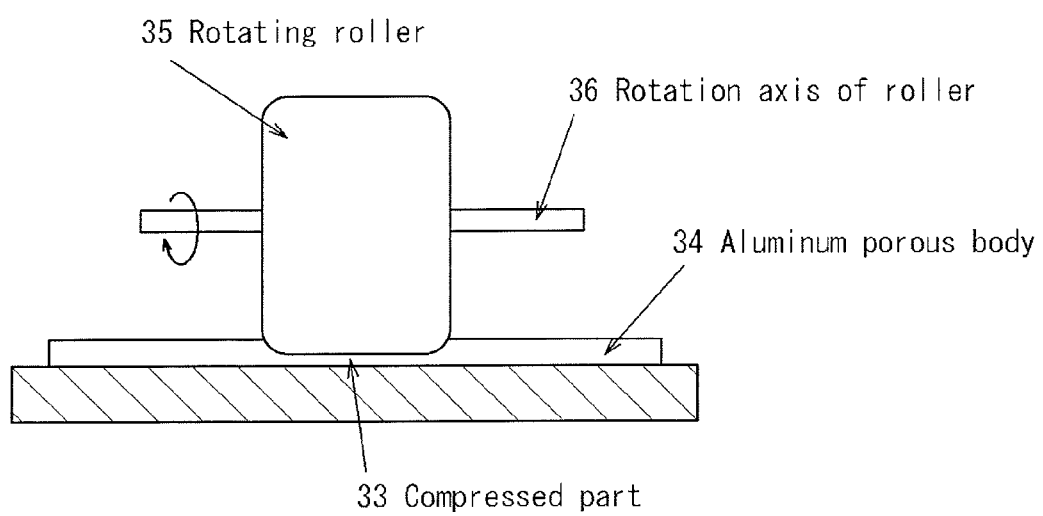
FIG. 3 is a view showing a step of compressing the central part of an aluminum porous body to form a compressed part.

In FIG. 3, the central part of an aluminum porous body 34 having a width of two aluminum porous bodies is compressed by a rotating roller 35 as a compressing jig to form a compressed part (lead part) 33. After compression, the compressed part 33 is cut along the center line of the central part to obtain two sheets of electrode current collectors having a compressed part at the end of the current collector.

Further, a plurality of current collectors can be obtained by forming a plurality of strip-shaped compressed parts at the central part of the aluminum porous body by using a plurality of rotating rollers, and cutting along the respective center lines of these strip-shaped compressed parts.

Bonding of Tab Lead to Compressed End Part

A tab lead is bonded to the compressed end part of the current collector thus obtained. It is preferred that a metal foil is used as a tab lead in order to reduce electric resistance of an electrode and the metal foil is bonded to the surface of at least one side of peripheries of the electrode. Further, in order to reduce electric resistance, welding is preferably employed as a bonding method.

Figure 4A:
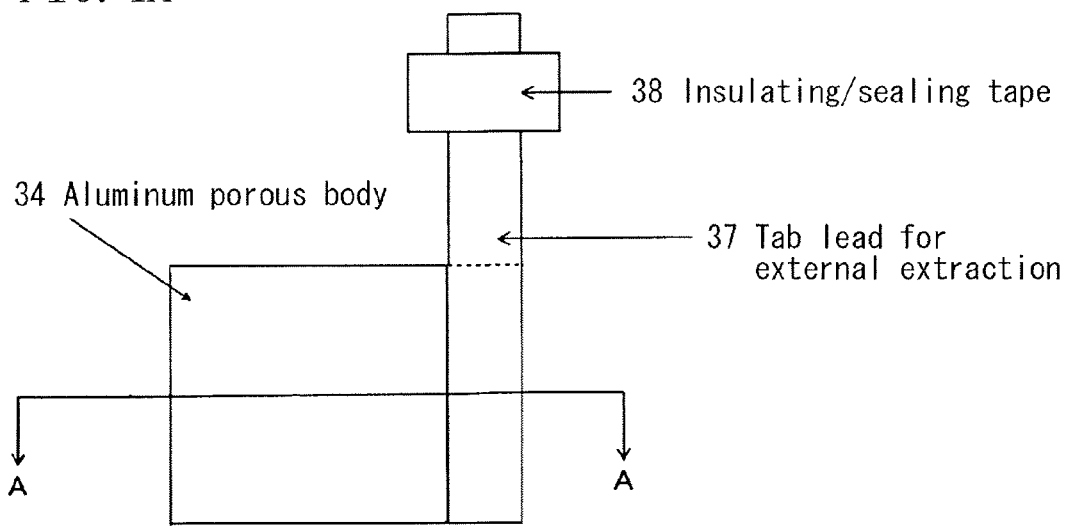
FIGS. 4A and 4B are views showing a state in which a tab lead is bonded to the compressed part in the end part of an aluminum porous body.
Figure 4B:
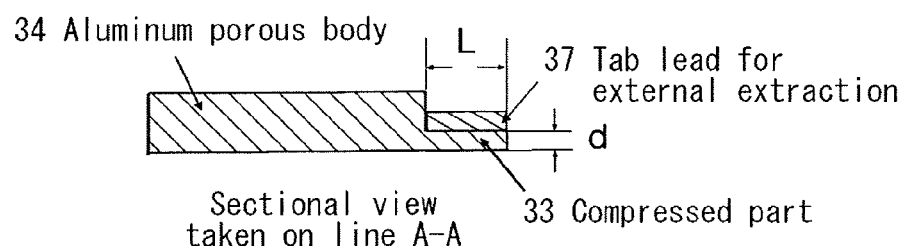

A schematic view of the obtained current collector is shown in FIG. 4A and FIG. 4B. A tab lead 37 is welded to a compressed part 33 of an aluminum porous body 34. FIG. 4B is a sectional view of FIG. 4A, taken on line A-A.

Figure 5:
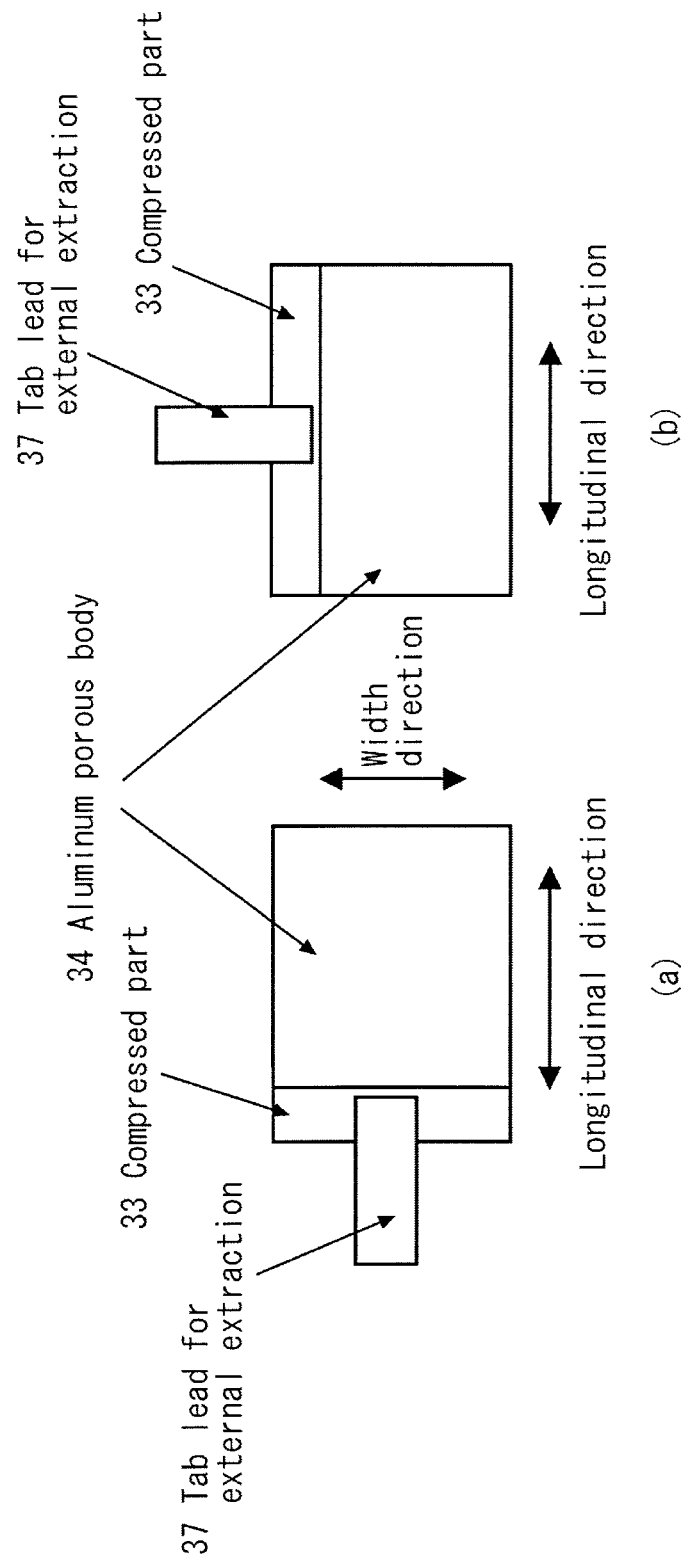
FIG. 5 is a view showing a state in which a tab lead is bonded to the compressed part in the end part of an aluminum porous body.

Further, the aluminum porous body is formed into the form of a long sheet for mass production, and the long sheet of the aluminum porous body is carried in one direction (longitudinal direction) and finally wound up around a wind-up roller. Therefore, the aluminum porous body may have anisotropy in some cases, and an anisotropic property is generated in electric conductivity. Accordingly, a selection is appropriately made between the case where a tab lead 37 is attached to a compressed part formed in a width direction as shown in (a) of FIG. 5 and the case where a tab lead 37 is attached to a compressed part formed in a longitudinal direction as shown in (b) of FIG. 5.

The compressed part for welding a metal foil preferably has a width L of 10 mm or less since a too wide metal foil causes wasted space to increase in a battery and a capacity density of the battery is decreased. When the electrode is too narrow, since welding becomes difficult and the effect of collecting a current is deteriorated, the width is preferably 2 mm or more.

As a method of welding, a method of resistance welding or ultrasonic welding can be used, but the ultrasonic welding is preferred because of its larger bonding area.

Metal Foil

A material of the metal foil is preferably aluminum in consideration of electric resistance and tolerance for an electrolytic solution. Further, since impurities in the metal foil causes the elution or reaction of the impurities in a battery, a capacitor or a lithium-ion capacitor, an aluminum foil having a purity of 99.99% or more is preferably used. The thickness of the welded portion is preferably smaller than that of the electrode itself.

The aluminum foil is preferably made to have a thickness of 20 to 500 μm.

Welding of a tab lead may be performed before filling a current collector with an active material, or may be performed after the filling. Examples of a method of welding a tab lead include the following three methods.

(1) A method in which after filling an aluminum porous body with an active material, the active material is removed from a portion to be welded by an ultrasonic vibration method or the like, the portion to be welded is compressed by pressing to form a compressed part, and a tab lead is welded to the compressed part.

(2) A method in which a portion to be welded of an aluminum porous body is compressed by pressing to form a compressed part, the compressed part is masked with a masking tape, the aluminum porous body is filled with an active material, the masking tape is then removed, and a tab lead is welded to the compressed part.

(3) A method in which a portion to be welded of an aluminum porous body is compressed by pressing to form a compressed part, a tab lead is welded to the compressed part, and then the aluminum porous body is filled with an active material.

Since aluminum has a passive layer at its surface, it hardly achieves welding strength. Moreover, there is a problem that the welding strength is further decreased when an active material exists on the surface of the passive layer.

In accordance with the above method (1), the above-mentioned problem does not arise since the active material present in the portion to be welded has been removed.

In accordance with the above method (2), the welding strength is improved since the active material does not exist in the compressed part by masking the compressed part, and further the compressed part is high in a density of existing aluminum and a contact area between the tab lead and aluminum increases.

In accordance with the above method (3), welding is not affected by the active material since welding is performed before filling the active material, and the welding strength is improved since the compressed part is high in a density of existing aluminum and a contact area between the tab lead and aluminum increases.

Though in the above description, the compressing step of the end part and the bonding step of the tab lead have been described as separate steps, the compressing step and the bonding step may be performed simultaneously. In this case, a roller, in which a roller portion to be brought into contact, as a compressing roller, with an end part for bonding a tab lead of the aluminum porous body sheet can perform resistance welding, is used, and the aluminum porous body sheet and the metal foil are simultaneously supplied to the roller to perform compressing of the end part and metal foil welding to the compressed part simultaneously.

As a method of performing the compressing step and the bonding step simultaneously, the following method is conceivable.

A method in which after filling a three-dimensional network aluminum porous body with an active material, the active material in a portion within a 2 to 10 mm width from an end side at one end part of the three-dimensional network aluminum porous body filled with the active material is removed, and a tab lead is welded while compressing the portion from which the active material is removed.

A method for producing the electrode comprising steps of welding a tab lead while compressing a portion within a 2 to 10 mm width from an end side at one end part of the three-dimensional network aluminum porous body; and filling the three-dimensional network aluminum porous body having the tab lead welded to the compressed part with an active material.

As described above, when the compressing step and the tab lead-wilding step are performed in one step, it becomes possible to reduce cost since a part of a skeleton is penetrated into the tab lead to lead the bonding of the aluminum porous body to the tab lead becomes more firm in compressing the porous body, and the number of steps is decreased.

Further, the following method may be employed in place of the method of performing masking described in the above (2).

A method in which a portion within a 2 to 10 mm width from an end side at one end part of a three-dimensional network aluminum porous body is compressed to form a strip-shaped compressed part, the three-dimensional network aluminum porous body is filled with an active material, the active material is removed from the strip-shaped compressed part of the three-dimensional network aluminum porous body filled with the active material, and a tab lead is welded to the compressed part from which the active material is removed.

When performing these methods, it becomes possible to reduce cost since the steps of performing masking and removing masking are eliminated.

(Step of Filling Active Material)

An electrode is obtained by filling the current collector with an active material. A type of the active material is appropriately selected in accordance with the purpose of use of the electrode.

For filling the active material, publicly known methods such as a method of filling by immersion and a coating method can be employed. Examples of the coating method include a roll coating method, an applicator coating method, an electrostatic coating method, a powder coating method, a spray coating method, a spray coater coating method, a bar coater coating method, a roll coater coating method, a dip coater coating method, a doctor blade coating method, a wire bar coating method, a knife coater coating method, a blade coating method, and a screen printing method.

When the active material is filled, a conduction aid or a binder is added as required, and an organic solvent is mixed therewith to prepare a slurry, and the prepared slurry is filled into the aluminum porous body by using the above-mentioned filling method.

FIG. 1 shows a method of filling a porous body with a slurry by a roll coating method. As shown in the figure, the slurry is supplied onto a porous body sheet and this sheet is passed between a pair of rotating rollers opposed to each other at a predetermined interval. The slurry is pressed and filled into the porous body when passing between the rotating rollers.

(Drying Step)

The porous body filled with the active material is transferred to a drying machine and heated to evaporate/remove the organic solvent and thereby an electrode material having the active material fixed in the porous body is obtained.

(Compressing Step)

The dried electrode material is compressed to a final thickness in the compressing step. A flat-plate press or a roller press is used as a pressing machine. The flat-plate press is preferable for suppressing the elongation of a current collector, but is not suitable for mass production, and therefore roller press capable of continuous treatment is preferably used.

FIG. 1 shows the case of compressing by roller pressing.

(Cutting Step)

In order to improve the ability of mass production of the electrode material, it is preferred that the width of a sheet of the aluminum porous body is set to the width of a plurality of final products and the sheet is cut along its traveling direction with a plurality of blades to form a plurality of long sheets of electrode materials. This cutting step is a step of dividing a long length of electrode material into a plurality of long lengths of electrode materials.

(Winding-Up Step)

This step is a step of winding up the plurality of long sheets of electrode materials obtained in the above-mentioned cutting step around a wind-up roller.

Next, applications of the electrode material obtained in the above-mentioned step will be described.

Examples of main applications of the electrode material in which the aluminum porous body is used as a current collector include electrodes for nonaqueous electrolyte batteries such as a lithium battery and a molten salt battery, electrodes for capacitors using a nonaqueous electrolytic solution, and electrodes for lithium-ion capacitors using nonaqueous electrolytic solution.

Hereinafter, these applications will be described.

(Lithium Battery)

Next, an electrode material for batteries using an aluminum porous body and a battery will be described below. For example, when the aluminum porous body is used in a positive electrode for a lithium battery (including a lithium-ion secondary battery, etc.), lithium cobalt oxide ($LiCoO_2$), lithium manganese oxide ($LiMn_2O_4$), lithium nickel dioxide ($LiNiO_2$) or the like is used as an active material. The active material is used in combination with a conduction aid and a binder.

In a conventional positive electrode material for lithium batteries, an electrode formed by applying an active material to the surface of an aluminum foil is used. Though a lithium battery has a higher capacity than a nickel hydride battery or a capacitor, a further increase in capacity is required in automobile applications. Therefore, in order to increase a battery capacity per unit area, the application thickness of the active material is increased. Further, in order to effectively utilize the active material, the active material needs to be in electrical contact with the aluminum foil, a current collector, and therefore, the active material is mixed with a conduction aid to be used.

In contrast, the aluminum porous body according to the present invention has a high porosity and a large surface area per unit area. Thus, a contact area between the current collector and the active material is increased, and therefore, the active material can be effectively utilized, the battery capacity can be improved, and the amount of the conduction aid to be mixed can be decreased. In a lithium battery, the above-mentioned positive electrode materials are used for a positive electrode, and for a negative electrode, a foil, a punched metal or a porous body of copper or nickel is used as a current collector and a negative electrode active material such as graphite, lithium titanium oxide ($Li_4Ti_5O_{12}$), an alloy of Sn or Si, lithium metal or the like is used. The negative electrode active material is also used in combination with a conduction aid and a binder.

Such a lithium battery can have an increased capacity even with a small electrode area and accordingly have a higher energy density than a conventional lithium battery using an aluminum foil. The effects of the present invention in a secondary battery has been mainly described above, but the effects of the present invention in a primary battery is the same as that in the secondary battery, and a contact area is increased when the aluminum porous body is filled with the active material and a capacity of the primary battery can be improved.

(Configuration of Lithium Battery)

Figure 11:
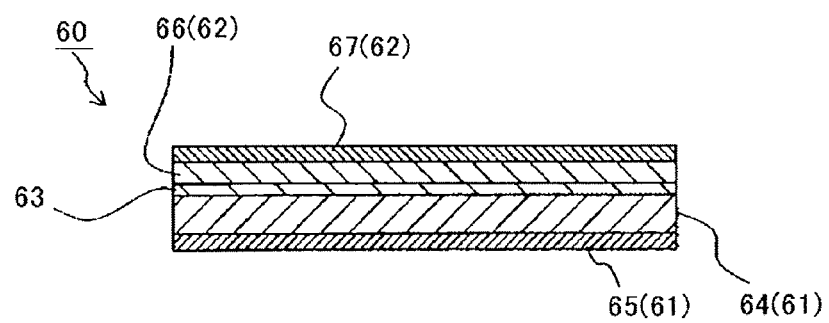
FIG. 11 is a schematic view showing an example of a structure in which an aluminum porous body is applied to a lithium battery.

An electrolyte used in a lithium battery includes a nonaqueous electrolytic solution and a solid electrolyte. FIG. 11 is a vertical sectional view of a solid-state lithium battery using a solid electrolyte. A solid-state lithium battery 60 includes a positive electrode 61, a negative electrode 62, and a solid electrolyte layer (SE layer) 63 disposed between both electrodes. The positive electrode 61 includes a positive electrode layer (positive electrode body) 64 and a current collector 65 of positive electrode, and the negative electrode 62 includes a negative electrode layer 66 and a current collector 67 of negative electrode.

As the electrolyte, a nonaqueous electrolytic solution described later is used besides the solid electrolyte. In this case, a separator (porous polymer film, nonwoven fabric, paper, etc.) is disposed between both electrodes, and both electrodes and separator are impregnated with the nonaqueous electrolytic solution.

(Active Material Filled into Aluminum Porous Body)

When an aluminum porous body is used in a positive electrode for a lithium battery, a material that can extract/insert lithium can be used as an active material, and an aluminum porous body filled with such a material can provide an electrode suitable for a lithium secondary battery. As the material of the positive electrode active material, for example, lithium cobalt oxide ($LiCoO_2$), lithium nickel dioxide ($LiNiO_2$), lithium cobalt nickel oxide ($LiCo_{0.3}Ni_{0.7}O_2$), lithium manganese oxide ($LiMn_2O_4$), lithium titanium oxide ($Li_4Ti_5O_{12}$), lithium manganese oxide compound ($LiMyMn_{2-y}O_4$); M=Cr, Co, Ni) or lithium acid is used. The active material is used in combination with a conduction aid and a binder. Examples of the material of the positive electrode active material include transition metal oxides such as conventional lithium iron phosphate and olivine compounds which are compounds ($LiFePO_4$, $LiFe_{0.5}Mn_{0.5}PO_4$) of the lithium iron phosphate. Further, the transition metal elements contained in these materials may be partially substituted with another transition metal element.

Moreover, examples of other positive electrode active material include lithium metal in which a skeleton is a sulfide-based chalcogenide such as $TiS_2$, $V_2S_3$, FeS, $FeS_2$ and LiMSx (M is a transition metal element such as Mo, Ti, Cu, Ni, or Fe, or Sb, Sn or Pb), and a metal oxide such as $TiO_2$, $Cr_3O_8$, $V_2O_5$ or $MnO_2$. Herein, the above-mentioned lithium titanate ($Li_4Ti_5O_{12}$) can also be used as a negative electrode active material.

(Electrolytic Solution Used in Lithium Battery)

A nonaqueous electrolytic solution is used in a polar aprotic organic solvent, and specific examples of the nonaqueous electrolytic solution include ethylene carbonate, diethyl carbonate, dimethyl carbonate, propylene carbonate, γ-butyrolactone and sulfolane. As a supporting salt, lithium tetrafluoroborate, lithium hexafluorophosphate, an imide salt or the like is used. The concentration of the supporting salt serving as an electrolyte is preferably higher, but a supporting salt having a concentration of about 1 mol/L is generally used since there is a limit of dissolution.

(Solid Electrolyte Filled into Aluminum Porous Body)

The aluminum porous body may be additionally filled with a solid electrolyte besides the active material. The aluminum porous body can be suitable for an electrode for a solid-state lithium battery by filling the aluminum porous body with the active material and the solid electrolyte. However, the ratio of the active material to materials filled into the aluminum porous body is preferably adjusted to 50 mass % or more and more preferably 70 mass % or more from the viewpoint of ensuring a discharge capacity.

A sulfide-based solid electrolyte having high lithium ion conductivity is preferably used for the solid electrolyte, and examples of the sulfide-based solid electrolyte include sulfide-based solid electrolytes containing lithium, phosphorus and sulfur. The sulfide-based solid electrolyte may further contain an element such as O, Al, B, Si or Ge.

Such a sulfide-based solid electrolyte can be obtained by a publicly known method. Examples of a method of forming the sulfide-based solid electrolyte include a method in which lithium sulfide ($Li_2S$) and diphosphorus pentasulfide ($P_2S_5$) are prepared as starting materials, $Li_2S$ and $P_2S_5$ are mixed in proportions of about 50:50 to about 80:20 in terms of mole ratio, and the resulting mixture is fused and quenched (melting and rapid quenching method) and a method of mechanically milling the quenched product (mechanical milling method).

The sulfide-based solid electrolyte obtained by the above-mentioned method is amorphous. The sulfide-based solid electrolyte can also be utilized in this amorphous state, but it may be subjected to a heat treatment to form a crystalline sulfide-based solid electrolyte. It can be expected to improve lithium ion conductivity by this crystallization.

(Filling of Active Material into Aluminum Porous Body)

For filling the active material (active material and solid electrolyte), publicly known methods such as a method of filling by immersion and a coating method can be employed. Examples of the coating method include a roll coating method, an applicator coating method, an electrostatic coating method, a powder coating method, a spray coating method, a spray coater coating method, a bar coater coating method, a roll coater coating method, a dip coater coating method, a doctor blade coating method, a wire bar coating method, a knife coater coating method, a blade coating method, and a screen printing method.

When the active material (active material and solid electrolyte) is filled, for example, a conduction aid or a binder is added as required, and an organic solvent or water is mixed therewith to prepare a slurry of a positive electrode mixture. An aluminum porous body is filled with this slurry by the above-mentioned method. As the conduction aid, for example, carbon black such as acetylene black (AB) or Ketjen Black (KB), or carbon fibers such as carbon nano tubes (CNT) may be used. As the binder, for example, polyvinylidene fluoride (PVDF), polytetrafluoroethylene (PTFE), polyvinyl alcohol (PVA), carboxymethyl cellulose (CMC), xanthan gum and the like can be used.

The organic solvent used in preparing the slurry of a positive electrode mixture can be appropriately selected as long as it does not adversely affect materials (i.e., an active material, a conduction aid, a binder, and a solid electrolyte as required) to be filled into the aluminum porous body. Examples of the organic solvent include n-hexane, cyclohexane, heptane, toluene, xylene, trimethylbenzene, dimethyl carbonate, diethyl carbonate, ethyl methyl carbonate, propylene carbonate, ethylene carbonate, butylene carbonate, vinylene carbonate, vinyl ethylene carbonate, tetrahydrofuran, 1,4-dioxane, 1,3-dioxolan, ethylene glycol, and N-methyl-2-pyrrolidone. Further, when water is used as a solvent, a surfactant may be used for enhancing filling performance.

In addition, in a conventional positive electrode material for lithium batteries, an electrode is formed by applying an active material onto the surface of an aluminum foil. In order to increase a battery capacity per unit area, the application thickness of the active material is increased. Further, in order to effectively utilize the active material, the active material needs to be in electrical contact with the aluminum foil, and therefore, the active material is mixed with a conduction aid to be used. In contrast, the aluminum porous body according to the present invention has a high porosity and a large surface area per unit area. Thus, a contact area between the current collector and the active material is increased, and therefore, the active material can be effectively utilized, the battery capacity can be improved, and the amount of the conduction aid to be mixed can be decreased.

(Electrode for Capacitor)

Figure 12:
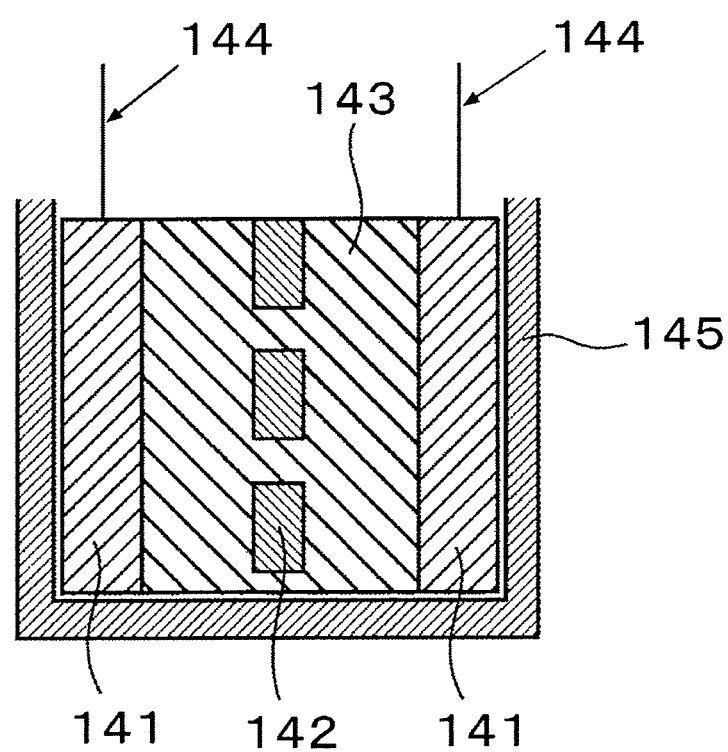
FIG. 12 is a schematic view showing an example of a structure in which an aluminum porous body is applied to a capacitor using a nonaqueous electrolytic solution.

FIG. 12 is a schematic sectional view showing an example of a capacitor produced by using the electrode material for a capacitor. An electrode material formed by supporting an electrode active material on an aluminum porous body is disposed as a polarizable electrode 141 in an organic electrolyte 143 partitioned with a separator 142. The polarizable electrode 141 is connected to a lead wire 144, and all these components are housed in a case 145. When the aluminum porous body is used as a current collector, the surface area of the current collector is increased and a contact area between the current collector and activated carbon as an active material is increased, and therefore, a capacitor that can realize a high output and a high capacity can be obtained.

In order to produce an electrode for a capacitor, a current collector of the aluminum porous body is filled with the activated carbon as an active material. The activated carbon is used in combination with a conduction aid or a binder.

In order to increase the capacity of the capacitor, the amount of the activated carbon as a main component is preferably in a large amount, and the amount of the activated carbon is preferably 90% or more in terms of the composition ratio after drying (after removing a solvent). The conduction aid and the binder are necessary, but the amounts thereof are preferably as small as possible because they are causes of a reduction in capacity and further the binder is a cause of an increase in internal resistance. Preferably, the amount of the conduction aid is 10 mass % or less and the amount of the binder is 10 mass % or less.

When the surface area of the activated carbon is larger, the capacity of the capacitor is larger, and therefore, the activated carbon preferably has a specific surface area of $1000 \text{ m}^2/\text{g}$ or more. As a material of the activated carbon, a plant-derived palm shell, a petroleum-based material or the like may be used. In order to increase the surface area of the activated carbon, the material is preferably activated by use of steam or alkali.

The electrode material predominantly composed of the activated carbon is mixed and stirred to obtain an activated carbon paste. This activated carbon paste is filled into the above-mentioned current collector and dried, and its density is increased by compressing with a roller press or the like as required to obtain an electrode for a capacitor.

(Filling of Activated Carbon into Aluminum Porous Body)

For filling of the activated carbon, publicly known methods such as a method of filling by immersion and a coating method can be employed. Examples of the coating method include a roll coating method, an applicator coating method, an electrostatic coating method, a powder coating method, a spray coating method, a spray coater coating method, a bar coater coating method, a roll coater coating method, a dip coater coating method, a doctor blade coating method, a wire bar coating method, a knife coater coating method, a blade coating method, and a screen printing method.

When the active material is filled, for example, a conduction aid or a binder is added as required, and an organic solvent or water is mixed therewith to prepare a slurry of a positive electrode mixture. An aluminum porous body is filled with this slurry by the above-mentioned method. As the conduction aid, for example, carbon black such as acetylene black (AB) or Ketjen Black (KB), or carbon fibers such as carbon nano tubes (CNT) may be used. As the binder, for example, polyvinylidene fluoride (PVDF), polytetrafluoroethylene (PTFE), polyvinyl alcohol (PVA), carboxymethyl cellulose (CMC), xanthan gum and the like can be used.

The organic solvent used in preparing the slurry of a positive electrode mixture can be appropriately selected as long as it does not adversely affect materials (i.e., an active material, a conduction aid, a binder, and a solid electrolyte as required) to be filled into the aluminum porous body. Examples of the organic solvent include n-hexane, cyclohexane, heptane, toluene, xylene, trimethylbenzene, dimethyl carbonate, diethyl carbonate, ethyl methyl carbonate, propylene carbonate, ethylene carbonate, butylene carbonate, vinylene carbonate, vinyl ethylene carbonate, tetrahydrofuran, 1,4-dioxane, 1,3-dioxolan, ethylene glycol, and N-methyl-2-pyrrolidone. Further, when water is used as a solvent, a surfactant may be used for enhancing filling performance.

(Preparation of Capacitor)

The electrode obtained in the above-mentioned manner is punched out into an appropriate size to prepare two sheets, and these two electrodes are opposed to each other with a separator interposed therebetween. A porous film or nonwoven fabric made of cellulose or a polyolefin resin is preferably used for the separator. Then, the electrodes are housed in a cell case by use of required spacers, and impregnated with an electrolytic solution. Finally, a lid is put on the case with an insulating gasket interposed between the lid and the case and is sealed, and thereby an electric double layer capacitor can be prepared. When a nonaqueous material is used, materials of the electrode and the like are preferably adequately dried for decreasing the water content in the capacitor as much as possible. Preparation of the capacitor is performed in low-moisture environments, and sealing may be performed in reduced-pressure environments. In addition, the capacitor is not particularly limited as long as the current collector and the electrode of the present invention are used, and capacitors may be used which are prepared by a method other than this method.

Though as the electrolytic solution, both an aqueous system and a nonaqueous system can be used, the nonaqueous system is preferably used since its voltage can be set at a higher level than that of the aqueous system. In the aqueous system, potassium hydroxide or the like can be used as an electrolyte. Examples of the nonaqueous system include many ionic liquids in combination of a cation and an anion. As the cation, lower aliphatic quaternary ammonium, lower aliphatic quaternary phosphonium, imidazolium or the like is used, and as the anion, ions of metal chlorides, ions of metal fluorides, and imide compounds such as bis(fluorosulfonyl)imide and the like are known. Further, as the nonaqueous system, there is a polar aprotic organic solvent, and specific examples thereof include ethylene carbonate, diethyl carbonate, dimethyl carbonate, propylene carbonate, γ-butyrolactone and sulfolane. As a supporting salt in the nonaqueous electrolytic solution, lithium tetrafluoroborate, lithium hexafluorophosphate or the like is used.

(Lithium-Ion Capacitor)

Figure 13:
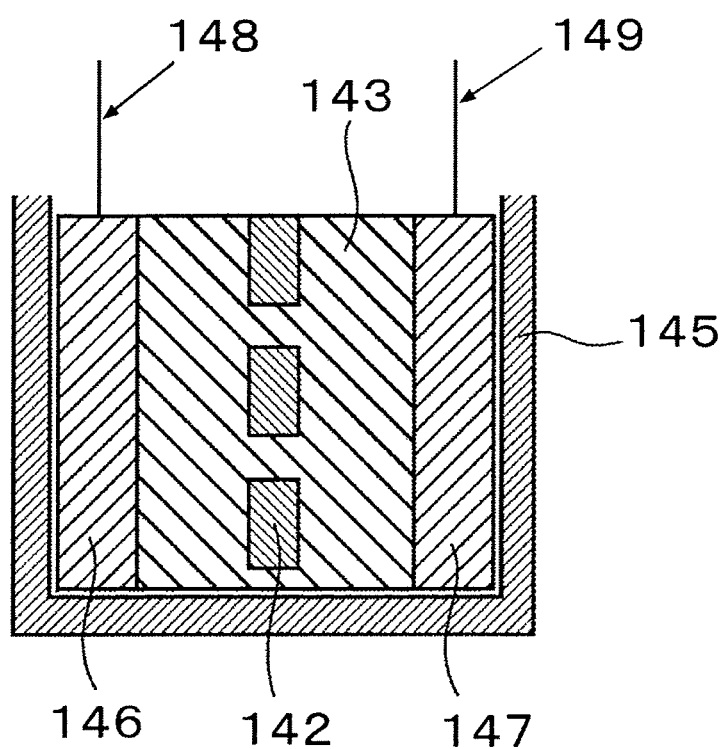
FIG. 13 is a schematic view showing an example of a structure in which an aluminum porous body is applied to a lithium-ion capacitor.

FIG. 13 is a schematic sectional view showing an example of a lithium-ion capacitor produced by using the electrode material for a lithium-ion capacitor. In an organic electrolytic solution 143 partitioned with a separator 142, an electrode material formed by supporting a positive electrode active material on an aluminum porous body is disposed as a positive electrode 146 and an electrode material formed by supporting a negative electrode active material on a current collector is disposed as a negative electrode 147. The positive electrode 146 and the negative electrode 147 are connected to a lead wire 148 and a lead wire 149, respectively, and all these components are housed in a case 145. When the aluminum porous body is used as a current collector, the surface area of the current collector is increased, and therefore, even when activated carbon as an active material is applied onto the aluminum porous body in a thin manner, a capacitor that can realize a high output and a high capacity can be obtained.
(Positive Electrode)

In order to produce an electrode for a lithium-ion capacitor, a current collector of the aluminum porous body is filled with activated carbon as an active material. The activated carbon is used in combination with a conduction aid or a binder.

In order to increase the capacity of the lithium-ion capacitor, the amount of the activated carbon as a main component is preferably in a large amount, and the amount of the activated carbon is preferably 90% or more in terms of the composition ratio after drying (after removing a solvent). The conduction aid and the binder are necessary, but the amounts thereof are preferably as small as possible because they are causes of a reduction in capacity and further the binder is a cause of an increase in internal resistance. Preferably, the amount of the conduction aid is 10 mass % or less and the amount of the binder is 10 mass % or less.

When the surface area of the activated carbon is larger, the capacity of the lithium-ion capacitor is larger, and therefore, the activated carbon preferably has a specific surface area of 1000 $m^2/g$ or more. As a material of the activated carbon, a plant-derived palm shell, a petroleum-based material or the like may be used. In order to increase the surface area of the activated carbon, the material is preferably activated by use of steam or alkali. As the conduction aid, Ketjen Black, acetylene black, carbon fibers or composite materials thereof may be used. As the binder, polyvinylidene fluoride, polytetrafluoroethylene, polyvinyl alcohol, carboxymethyl cellulose, xanthan gum and the like can be used. A solvent may be appropriately selected from water and an organic solvent depending on the type of the binder. In the organic solvent, N-methyl-2-pyrrolidone is often used. Further, when water is used as a solvent, a surfactant may be used for enhancing filling performance.

The electrode material predominantly composed of the activated carbon is mixed and stirred to obtain an activated carbon paste. This activated carbon paste is filled into the above-mentioned current collector and dried, and its density is increased by compressing with a roller press or the like as required to obtain an electrode for a lithium-ion capacitor.
(Filling of Activated Carbon into Aluminum Porous Body)

For filling of the activated carbon, publicly known methods such as a method of filling by immersion and a coating method can be employed. Examples of the coating method include a roll coating method, an applicator coating method, an electrostatic coating method, a powder coating method, a spray coating method, a spray coater coating method, a bar coater coating method, a roll coater coating method, a dip coater coating method, a doctor blade coating method, a wire bar coating method, a knife coater coating method, a blade coating method, and a screen printing method.

When the active material is filled, for example, a conduction aid or a binder is added as required, and an organic solvent or water is mixed therewith to prepare a slurry of a positive electrode mixture. An aluminum porous body is filled with this slurry by the above-mentioned method. As the conduction aid, for example, carbon black such as acetylene black (AB) or Ketjen Black (KB), or carbon fibers such as carbon nano tubes (CNT) may be used. As the binder, for example, polyvinylidene fluoride (PVDF), polytetrafluoroethylene (PTFE), polyvinyl alcohol (PVA), carboxymethyl cellulose (CMC), xanthan gum and the like can be used.

The organic solvent used in preparing the slurry of a positive electrode mixture can be appropriately selected as long as it does not adversely affect materials (i.e., an active material, a conduction aid, a binder, and a solid electrolyte as required) to be filled into the aluminum porous body. Examples of the organic solvent include n-hexane, cyclohexane, heptane, toluene, xylene, trimethylbenzene, dimethyl carbonate, diethyl carbonate, ethyl methyl carbonate, propylene carbonate, ethylene carbonate, butylene carbonate, vinylene carbonate, vinyl ethylene carbonate, tetrahydrofuran, 1,4-dioxane, 1,3-dioxolan, ethylene glycol, and N-methyl-2-pyrrolidone. Further, when water is used as a solvent, a surfactant may be used for enhancing filling performance.
(Negative Electrode)

A negative electrode is not particularly limited and a conventional negative electrode for lithium batteries can be used, but an electrode, in which an active material is filled into a porous body made of copper or nickel like the foamed nickel described above, is preferable because a conventional electrode, in which a copper foil is used for a current collector, has a small capacity. Further, in order to perform the operations as a lithium-ion capacitor, the negative electrode is preferably doped with lithium ions in advance. As a doping method, publicly known methods can be employed. Examples of the doping methods include a method in which a lithium metal foil is affixed to the surface of a negative electrode and this is dipped into an electrolytic solution to dope it, a method in which an electrode having lithium metal fixed thereto is arranged in a lithium-ion capacitor, and after assembling a cell, an electric current is passed between the negative electrode and the lithium metal electrode to electrically dope the electrode, and a method in which an electrochemical cell is assembled from a negative electrode and lithium metal, and a negative electrode electrically doped with lithium is taken out and used.

In any method, it is preferred that the amount of lithium-doping is large in order to adequately decrease the potential of the negative electrode, but the negative electrode is preferably left without being doped by the capacity of the positive electrode because when the residual capacity of the negative electrode is smaller than that of the positive electrode, the capacity of the lithium-ion capacitor becomes small.
(Electrolytic Solution Used in Lithium-Ion Capacitor)

The same nonaqueous electrolytic solution as that used in a lithium battery is used for an electrolytic solution. A nonaqueous electrolytic solution is used in a polar aprotic organic solvent, and specific examples of the nonaqueous electrolytic solution include ethylene carbonate, diethyl carbonate, dimethyl carbonate, propylene carbonate, γ-butyrolactone and sulfolane. As a supporting salt, lithium tetrafluoroborate, lithium hexafluorophosphate, an imide salt or the like is used.
(Preparation of Lithium-Ion Capacitor)

The electrode obtained in the above-mentioned manner is punched out into an appropriate size, and is opposed to the negative electrode with a separator interposed between the punched out electrode and the negative electrode. The negative electrode may be an electrode doped with lithium ions by the above-mentioned method, and when the method of doping the negative electrode after assembling a cell is employed, an electrode having lithium metal connected thereto may be arranged in the cell. A porous film or nonwoven fabric made of cellulose or a polyolefin resin is preferably used for the separator. Then, the electrodes are housed in a cell case by use of required spacers, and impregnated with an electrolytic solution. Finally, a lid is put on the case with an insulating gasket interposed between the lid and the case and is sealed, and thereby a lithium-ion capacitor can be prepared. Materials of the electrode and the like are preferably adequately dried for decreasing the water content in the lithium ion capacitor as much as possible. Preparation of the lithium ion capacitor is performed in low-moisture environments, and sealing may be performed in reduced-pressure environments. In addition, the lithium ion capacitor is not particularly limited as long as the current collector and the electrode of the present invention are used, and capacitors may be used which are prepared by a method other than this method.

(Electrode for Molten Salt Battery)

The aluminum porous body can also be used as an electrode material for molten salt batteries. When the aluminum porous body is used as a positive electrode material, a metal compound such as sodium chromite ($N_aCrO_2$) or titanium disulfide ($TiS_2$) into which a cation of a molten salt serving as an electrolyte can be intercalated is used as an active material. The active material is used in combination with a conduction aid and a binder. As the conduction aid, acetylene black or the like may be used. As the binder, polytetrafluoroethylene (PTFE) and the like may be used. When sodium chromite is used as the active material and acetylene black is used as the conduction aid, the binder is preferably PTFE because PTFE can tightly bind sodium chromite and acetylene black.

The aluminum porous body can also be used as a negative electrode material for molten salt batteries. When the aluminum porous body is used as a negative electrode material, sodium alone, an alloy of sodium and another metal, carbon, or the like may be used as an active material. Sodium has a melting point of about 98° C. and a metal becomes softer with an increase in temperature. Thus, it is preferable to alloy sodium with another metal (Si, Sn, In, etc.). In particular, an alloy of sodium and Sn is preferred because of its easiness of handleability. Sodium or a sodium alloy can be supported on the surface of the aluminum porous body by electroplating, hot dipping, or another method. Alternatively, a metal (Si, etc.) to be alloyed with sodium may be deposited on the aluminum porous body by plating and then converted into a sodium alloy by charging in a molten salt battery.

Figure 14:
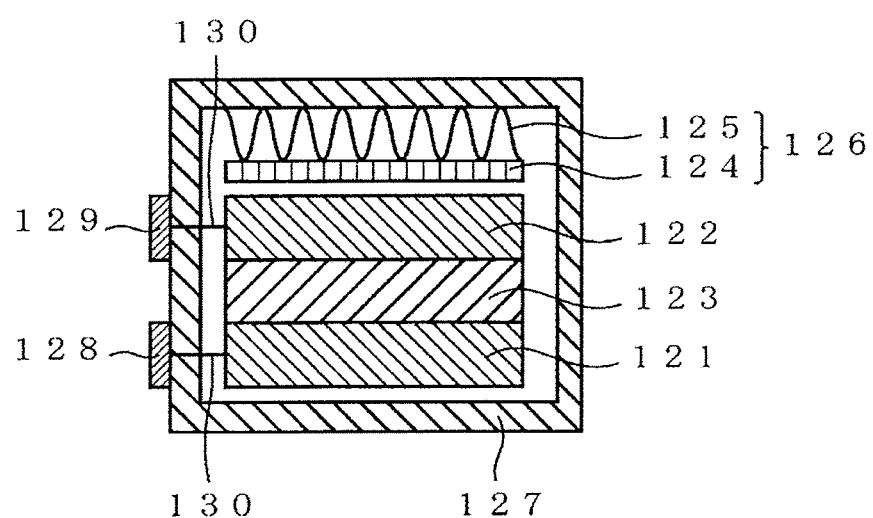
FIG. 14 is a schematic sectional view showing an example of a structure in which an aluminum porous body is applied to a molten salt battery.

FIG. 14 is a schematic sectional view showing an example of a molten salt battery in which the above-mentioned electrode material for batteries is used. The molten salt battery includes a positive electrode 121 in which a positive electrode active material is supported on the surface of an aluminum skeleton of an aluminum porous body, a negative electrode 122 in which a negative electrode active material is supported on the surface of an aluminum skeleton of an aluminum porous body, and a separator 123 impregnated with a molten salt of an electrolyte, which are housed in a case 127. A pressing member 126 including a presser plate 124 and a spring 125 for pressing the presser plate is arranged between the top surface of the case 127 and the negative electrode. By providing the pressing member, the positive electrode 121, the negative electrode 122 and the separator 123 can be evenly pressed to be brought into contact with one another even when their volumes have been changed. A current collector (aluminum porous body) of the positive electrode 121 and a current collector (aluminum porous body) of the negative electrode 122 are connected to a positive electrode terminal 128 and a negative electrode terminal 129, respectively, through a lead wire 130.

The molten salt serving as an electrolyte may be various inorganic salts or organic salts which melt at the operating temperature. As a cation of the molten salt, one or more cations selected from alkali metals such as lithium (Li), sodium (Na), potassium (K), rubidium (Rb) and cesium (Cs), and alkaline earth metals such as beryllium (Be), magnesium (Mg), calcium (Ca), strontium (Sr) and barium (Ba) may be used.

In order to decrease the melting point of the molten salt, it is preferable to use a mixture of at least two salts. For example, use of potassium bis(fluorosulfonyl)amide (K—N($SO_2F)_2$; KFSA) and sodium bis(fluorosulfonyl)amide (Na—N($SO_2F)_2$; NaFSA) in combination can decrease the battery operating temperature to 90° C. or lower.

The molten salt is used in the form of a separator impregnated with the molten salt. The separator prevents the contact between the positive electrode and the negative electrode, and may be a glass nonwoven fabric, a porous resin molded body or the like. A laminate of the positive electrode, the negative electrode, and the separator impregnated with the molten salt housed in a case is used as a battery.

EXAMPLES

Hereinafter, the present invention will be described in more detail based on examples, but the present invention is not limited thereto.

Example 1

Formation of Conductive Layer

A urethane foam having a porosity of 95%, about 50 pores (cells) per inch, a pore diameter of about 550 and a thickness of 1 mm was prepared as a resin molded body and was cut into a 100 mm×30 mm square. A film of aluminum was formed on the surface of the polyurethane foam in a weight per unit area of 10 g/m² by sputtering to form a conductive layer.

(Molten Salt Plating)

The urethane foam having a conductive layer formed on the surface thereof was loaded as a piece of work in a jig having an electricity supply function, and then the jig was placed in a glove box, the interior of which was adjusted to an argon atmosphere and low moisture (a dew point of −30° C. or lower), and was dipped in a molten salt aluminum plating bath (33 mol % EMIC-67 mol % $AlCl_3$) at a temperature of 40° C. The jig holding the piece of work was connected to the cathode of a rectifier, and an aluminum plate (purity 99.99%) of the counter electrode was connected to the anode. The piece of work was plated by applying a direct current at a current density of 3.6 A/dm² for 90 minutes to obtain an aluminum structure in which 150 g/m² of an aluminum plated layer was formed on the surface of the urethane foam. Stirring was performed with a stirrer using a Teflon (registered trademark) rotor. Here, the current density was calculated based on the apparent area of the urethane foam.

(Decomposition of Resin Molded Body)

Each of the above-mentioned aluminum structures was dipped in a LiCl—KCl eutectic molten salt at a temperature of 500° C., and a negative potential of −1 V was applied to the aluminum structure for 30 minutes. Air bubbles resulting from the decomposition reaction of the polyurethane were generated in the molten salt. Then, the aluminum structure was cooled to room temperature in the atmosphere and was washed with water to remove the molten salt, to obtain an aluminum porous body from which the resin had been removed. The obtained aluminum porous body had continuous pores and a high porosity as with the urethane foam used as a core material.

(Processing of End Part of Aluminum Porous Body)

The thickness of the obtained aluminum porous body was adjusted to 0.96 mm by roller pressing, and the aluminum porous body was cut into a piece of 5 cm square.

As the preparation of welding, a SUS block (rod) having a width of 5 mm and a hammer were prepared as a compressing jig, and the SUS block was placed at a location 5 mm from one end of the aluminum porous body and the porous body was compressed by beating the SUS block with the hammer to form a compressed part having a thickness of 100 μm.

Thereafter, a tab lead was welded by spot welding under the following conditions.

<Welding Condition>

Welding apparatus: Hi-Max 100 manufactured by Panasonic Corporation, model No. YG-101 UD (Voltage can be applied up to 250 V)

Capacity: 100 Ws, 0.6 kVA

Electrode: Copper electrode of 2 mm in diameter

Load: 8 kgf

Voltage: 140 V

<Tab Lead>

Material: aluminum

Dimension: width 5 mm, length 7 cm, thickness 100 μm

Surface condition: boehmite treatment

The tab lead was well bonded to the compressed part of the aluminum porous body by welding.

Example 2

In Example 1, after forming the compressed part, a masking tape was attached to the compressed part, and the aluminum porous body was filled with a slurry of an active material.

A lithium cobalt oxide powder (positive electrode active material) having an average particle diameter of 5 μm was prepared as an active material, and the lithium cobalt oxide powder, acetylene black (conduction aid) and PVDF (binder) were mixed in proportions of 90:5:5 in terms of mass %. N-Methyl-2-pyrrolidone (organic solvent) was added dropwise to the mixture, and the resulting mixture was mixed to prepare a paste-like slurry of a positive electrode mixture. Next, an aluminum porous body sample 1 was impregnated with the slurry of a positive electrode mixture to fill the slurry of a positive electrode mixture into the aluminum porous body sample 1, and then the slurry was dried at 100° C. for 40 minutes to remove the organic solvent.

Then, the masking tape was removed and a tab lead was welded to the compressed part in the same manner as in Example 1.

The tab lead was well bonded to the compressed part of the aluminum porous body by welding.

Example 3

In the same manner as in Example 2, the slurry of a positive electrode mixture was filled into the aluminum porous body after decomposing the resin molded body obtained in Example 1, and dried to prepare an aluminum porous body filled with an active material.

An end part of the porous body was immersed in an ultrasonic cleaning apparatus to remove the active material in a portion immersed in the apparatus by ultrasonic vibrations.

Then, in the same manner as in Example 1, a compressed part was formed at the end part of the aluminum porous body from which the active material was removed, and a tab lead was welded to the compressed part in the same manner as in Example 1.

The tab lead was well bonded to the compressed part of the aluminum porous body by welding.

The present invention has been described based on embodiments, but it is not limited to the above-mentioned embodiments. Variations to these embodiments may be made within the scope of identity and equivalence of the present invention.

INDUSTRIAL APPLICABILITY

The electrode produced by using the aluminum porous body for a current collector of the present invention increases the availability ratio of an active material per a unit volume and can realize a higher capacity, and can decrease the number of layers of a laminate to reduce processing cost in processing the aluminum porous body into an electrode, and therefore it can be suitably used as an electrode for nonaqueous electrolyte batteries (lithium battery, etc.), a capacitor, a lithium-ion capacitor and the like.

REFERENCE SIGNS LIST

1 Resin molded body
2 Conductive layer
3 Aluminum-plated layer
21a, 21b Plating bath
22 Strip-shaped resin
23, 28 Plating bath
24 Cylindrical electrode
25, 27 Anode
26 Electrode roller
32 Compressing jig
33 Compressed part
34 Aluminum porous body
35 Rotating roller
36 Rotation axis of roller
37 Tab lead
38 Insulating/sealing tape
41 Winding off roller
42 Compressing roller
43 Compressing-welding roller
44 Filling roller
45 Drying machine
46 Compressing roller
47 Cutting roller
48 Wind-up roller
49 Lead supply roller
50 Slurry supply nozzle
51 Slurry
60 Lithium battery
61 Positive electrode
62 Negative electrode
63 Solid electrolyte layer (SE layer)
64 Positive electrode layer (positive electrode body)
65 Current collector of positive electrode
66 Negative electrode layer
67 Current collector of negative electrode
121 Positive electrode
122 Negative electrode
123 Separator
124 Presser plate
125 Spring
126 Pressing member
127 Case
128 Positive electrode terminal
129 Negative electrode terminal
130 Lead wire 141 Polarizable electrode
142 Separator
143 Organic electrolytic solution
144 Lead wire
145 Case
146 Positive electrode
147 Negative electrode
148 Lead wire
149 Lead wire

The invention claimed is:

1. A current collector comprising:
   a strip-shaped compressed part compressed in a thickness direction at one end part of a three-dimensional network aluminum porous body, the compressed part having a width of 2 to 10 mm; and
   a tab lead bonding to the compressed part by welding.

2. The current collector according to claim 1, wherein a material of the tab lead contains aluminum.

3. An electrode, comprising filling a porous portion of the current collector according to claim 1 with an active material.

4. A method for producing the electrode according to claim 3, comprising steps of filling a three-dimensional network aluminum porous body with an active material; removing the active material in a portion within a 2 to 10 mm width from an end side at one end part of the three-dimensional network aluminum porous body filled with the active material; compressing the portion, from which the active material is removed, to form a strip-shaped compressed part; and welding a tab lead to the compressed part.

5. A method for producing the electrode according to claim 3, comprising steps of compressing a portion within a 2 to 10 mm width from an end side at one end part of a three-dimensional network aluminum porous body to form a strip-shaped compressed part; masking the compressed part; filling the three-dimensional network aluminum porous body subjected to the masking with an active material; removing the masking from the three-dimensional network aluminum porous body filled with the active material; and welding a tab lead to the compressed part from which the masking is removed.

6. A method for producing the electrode according to claim 3, comprising steps of compressing a portion within a 2 to 10 mm width from an end side at one end part of a three-dimensional network aluminum porous body to form a strip-shaped compressed part; welding a tab lead to the compressed part; and filling the three-dimensional network aluminum porous body having the tab lead welded to the compressed part with an active material.

7. A nonaqueous electrolyte battery, comprising using the electrode according to claim 3.

8. A capacitor using a nonaqueous electrolytic solution, comprising using the electrode according to claim 3.

9. A lithium-ion capacitor using a nonaqueous electrolytic solution, comprising using the electrode according to claim 3.

10. An electrode, comprising filling a porous portion of the current collector according to claim 2 with an active material.

11. A method for producing the electrode according to claim 10, comprising steps of filling a three-dimensional network aluminum porous body with an active material; removing the active material in a portion within a 2 to 10 mm width from an end side at one end part of the three-dimensional network aluminum porous body filled with the active material; compressing the portion, from which the active material is removed, to form a strip-shaped compressed part; and welding a tab lead to the compressed part.

12. A method for producing the electrode according to claim 10, comprising steps of compressing a portion within a 2 to 10 mm width from an end side at one end part of a three-dimensional network aluminum porous body to form a strip-shaped compressed part; masking the compressed part; filling the three-dimensional network aluminum porous body subjected to the masking with an active material; removing the masking from the three-dimensional network aluminum porous body filled with the active material; and welding a tab lead to the compressed part from which the masking is removed.

13. A method for producing the electrode according to claim 10, comprising steps of compressing a portion within a 2 to 10 mm width from an end side at one end part of a three-dimensional network aluminum porous body to form a strip-shaped compressed part; welding a tab lead to the compressed part; and filling the three-dimensional network aluminum porous body having the tab lead welded to the compressed part with an active material.

14. A nonaqueous electrolyte battery, comprising using the electrode according to claim 10.

15. A capacitor using a nonaqueous electrolytic solution, comprising using the electrode according to claim 10.

16. A lithium-ion capacitor using a nonaqueous electrolytic solution, comprising using the electrode according to claim 10.

* * * * *